United States Patent Office 2,717,353
Patented Sept. 6, 1955

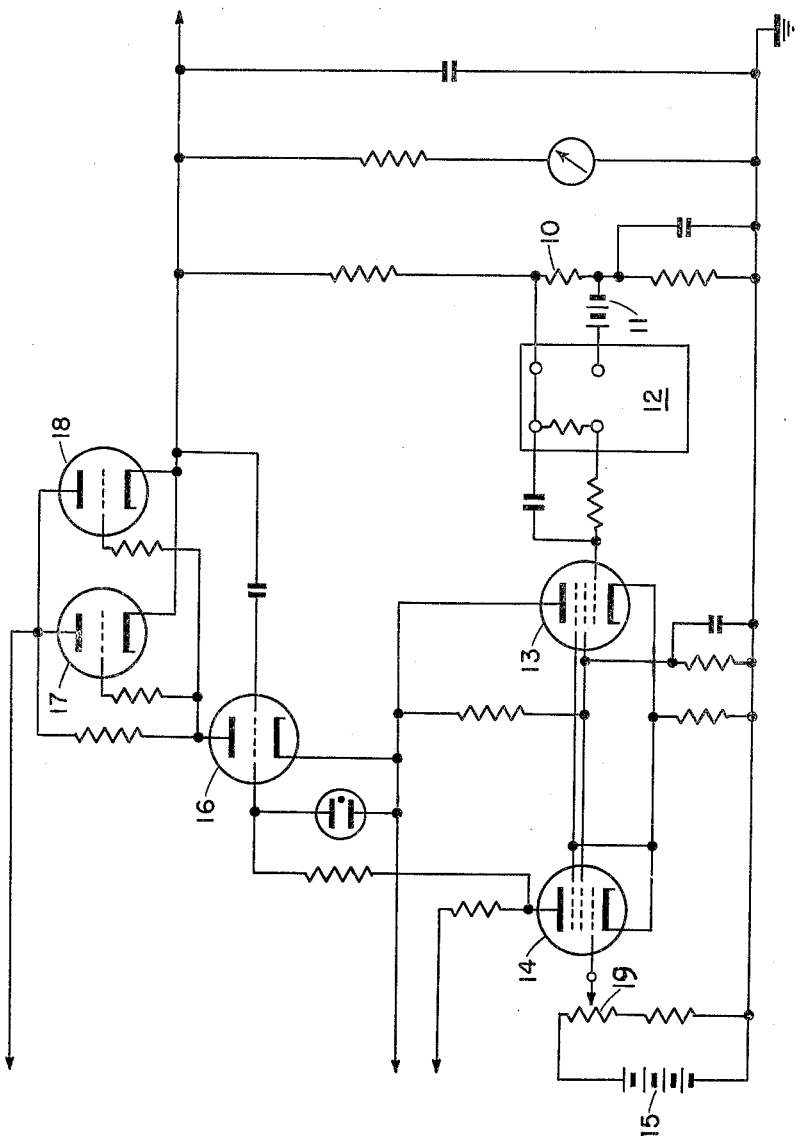
Donald M. Button &
Curtis Sewell, Jr.
INVENTORS

2,717,353
PRECISION REGULATED POWER SUPPLY

Curtis Sewell, Jr., Los Alamos, and Donald M. Button, Mesilla Park, N. Mex., assignors to the United States of America as represented by the United States Atomic Energy Commission Application October 27, 1954, Serial No. 465,169

1 Claim. (Cl. 323—22)

The present invention relates to a precision regulated power supply and more particularly to a regulated power supply having an output direct voltage fluctuation of less than 15 parts per 1,000,000.

The regulated power supply of the present invention responds to the difference between a standard voltage and variations in a part of the load voltage and therefore stabilizes the direct voltage output not only in respect to changes in load voltage, but also in spite of drift caused by contact potentials in the tubes of the power supply, changes in the input line voltage, and changes in voltage of a secondary reference. The result is accomplished by employing a standard cell as a first reference voltage and a direct current amplifier for amplifying any difference in voltage between a selected part of the output voltage and the reference voltage.

It is the principal object of the invention to produce an extremely stable electric power supply wherein the voltage output remains stable in spite of the fluctuations in the load, in the contact potentials of the electronic components, and in the voltage of the secondary reference potential.

An important consideration in designing and utilizing electronic equipment, such as power supplies, is the weight and size limitation imposed thereon. Therefore, another object of the invention is to produce a power supply having a desirable efficiency to weight and size ratio.

A further object of the invention is to produce a highly refined closely regulated power supply which is inexpensive and simple to manufacture relative to the precision regulation obtained.

Referring to the drawing, a regulated power supply embodying the principles of the present invention is shown schematically.

Two tubes 17 and 18 connected in parallel are connected in series with a power supply with the common terminal of their anodes being connected to the positive side thereof. A voltage divider network, including a resistor 10, is connected between the common terminal of the cathodes of the tubes 17 and 18 and ground. One input of a D. C. amplifier 12 is connected to one end of the resistor 10 and the other end thereof is connected to the other input of the D. C. amplifier 12 in series with a standard cell 11.

The output of the D. C. amplifier 12 is connected to the grid of tube 13. The cathodes of the tubes 13 and 14 have a common terminal which is connected in series with a resistor to ground. The control grid of tube 14 is connected to a secondary reference voltage source 15. The anode of tube 14 is in series relationship with a resistor and the grid of tube 16. The cathode of tube 16 is connected to the anode of tube 13. The grid of tube 16 is connected in series with a capacitor to the common terminal of the cathodes of tubes 17 and 18. The anode of tube 16 is connected in series with a resistor to the grid of tube 17; in series with another resistor to the grid of tube 18; and in series with still another resistor to the anodes of tubes 17 and 18.

The anodes of tubes 13 and 14 are connected to a suitable source of positive potential.

It will be noted from the drawings that the tubes 13 and 14 are preferably of the pentode type where the suppressor grids are coupled with a common terminal thereof connected to the common cathode terminal. The screen grids of the tubes are like-wise coupled together and have a common terminal leading to a positive source of potential through a suitable resistor.

Manifestly, other types of tubes may be employed in substitution for those of pentode type as shown in the drawings.

The resistor 10 is a part of a voltage divider connected across the output of the power supply B+. Any change in voltage on the output circuit will affect the voltage across the resistor 10. This voltage drop is compared with a standard cell 11 which is connected in polarity opposition with the output voltage sensed across resistor 10. Any increment in the voltage across resistor 10 is amplified by a direct current amplifier 12. The direct current amplifier 12 is to amplify very small differences between the voltage across the resistor 10 and that of the standard cell 11.

For purpose of explanation, it is assumed that the incremental voltage is an increase; therefore the amplified voltage is positive and is applied to the control grid of tube 13, raising its cathode potential along with the cathode of the tube 14. The control grid of tube 14 is maintained at a substantially constant potential by connection to a secondary reference battery 15 through a potentiometer 19. The increase of potential of the cathode of tube 14 decreases the current passing through its load and therefore raises the voltage on the anode, thereby raising the potential on the control grid of tube 16. By raising the potential on the control grid of tube 16, the potential on the anode of tube 16 is lowered which in turn, lowers the potential on the control grids of cathode coupled tubes 17 and 18, thereby increasing the resistance of these tubes and lowering the output voltage to the original voltage.

If a voltage drop across resistor 10 is ten microvolts above the reference voltage of the standard cell 11, this voltage drop will be amplified by direct current amplifier 12 to approximately three volts, assuming a reasonable gain of 300,000 for amplifier 12. This three volt potential is then applied to the control grid of the tube 13 and the procedure follows as above explained.

I claim:

A precision voltage regulated power supply having at least one grid controlled thermionic tube in series therewith, a voltage divider connected across the output of the power supply, a standard cell employed as a reference voltage connected in series with a portion of the voltage divider and in polarity opposition to the voltage drop thereon, a direct current amplifier having its input connected in series with the standard cell and the resistance portion, a first amplifier tube connected to the output of the direct current amplifier, a second amplifier tube having its grid connected to a secondary reference voltage and being cathode-coupled to the first amplifier tube the second amplifier tube being anode-coupled to the grid of the grid controlled thermionic tube whereby a change in voltage across the resistance portion is amplified by the direct current amplifier, is impressed on the first amplifier to change the output potential on the anode of the second amplifier to change the resistance of the grid controlled thermionic tube to restore the output potential to the selected value.

No references cited.